United States Patent

[11] 3,592,965

[72] Inventor Zaid Diaz
Cafeto Street #744, Highland Park, Rio Piedras, P.R.

[21] Appl. No. 662,409
[22] Filed Aug. 22, 1967
[45] Patented July 13, 1971

[54] APPARATUS FOR CONVERTING CATHODE RAY PORTRAYABLE INFORMATION TO SPACIAL IMAGES
49 Claims, 21 Drawing Figs.

[52] U.S. Cl. .......... 178/6.8, 35/35 A, 178/DIG. 32, 313/73, 315/21 R
[51] Int. Cl. .......... H04n 3/16
[50] Field of Search .......... 178/6.8; 35/35.1; 315/10, 56, 62, 69; 328/76; 307/157; 340/165, 324; 313/324.1

[56] References Cited

UNITED STATES PATENTS

| | | | |
|---|---|---|---|
| 3,134,044 | 5/1964 | Auvil | 315/10 |
| 1,889,576 | 7/1969 | Snook | 178/6 |
| 1,487,115 | 3/1924 | McQuarrie | 35/35.1 X |
| 2,327,222 | 8/1943 | Sell | 35/35.1 X |
| 2,432,123 | 12/1947 | Potter | 35/35.1 |
| 2,866,279 | 12/1958 | Surber | 35/35.1 |
| 3,229,387 | 1/1966 | Linvill | 35/35.1 |
| 2,122,102 | 6/1938 | Lundell | 178/6.8 X |

FOREIGN PATENTS

| | | | |
|---|---|---|---|
| 744,967 | 2/1956 | Great Britain | 35/35.1 |

OTHER REFERENCES

IBM TECHNICAL DISCLOSURE BULLETIN Vol. 6 No. 1 June 63 "Electronics" Jan. 25, 1965 pp. 35—36 "Electronics" July 10, 1967 pp. 44—45

*Primary Examiner*—Robert L. Griffin
*Assistant Examiner*—Donald E. Stout
*Attorneys*—Christen, Sabol, O'Brien and Caldwell and Wilfred G. Caldwell

ABSTRACT: This invention relates to apparatus for converting an optical image or electrical signals obtained from scanning an image, or from other information, into an electromechanical or sensory image conforming thereto. The invention, while applicable to many fields such as printing, metal forming, image reproduction in general, and others, nevertheless will be explained in connection with a preferred embodiment thereof which enables a blind person to perceive what is ahead of him by virtue of a sensory image or outline on his skin, preferably the back or other large area.

Inventor:
ZAID DIAZ

Inventor:
ZAID DIAZ

Inventor:
ZAID DIAZ

Inventor:
ZAID DIAZ

Inventor:
ZAID DIAZ

Inventor:
ZAID DIAZ

Inventor:
ZAID DIAZ

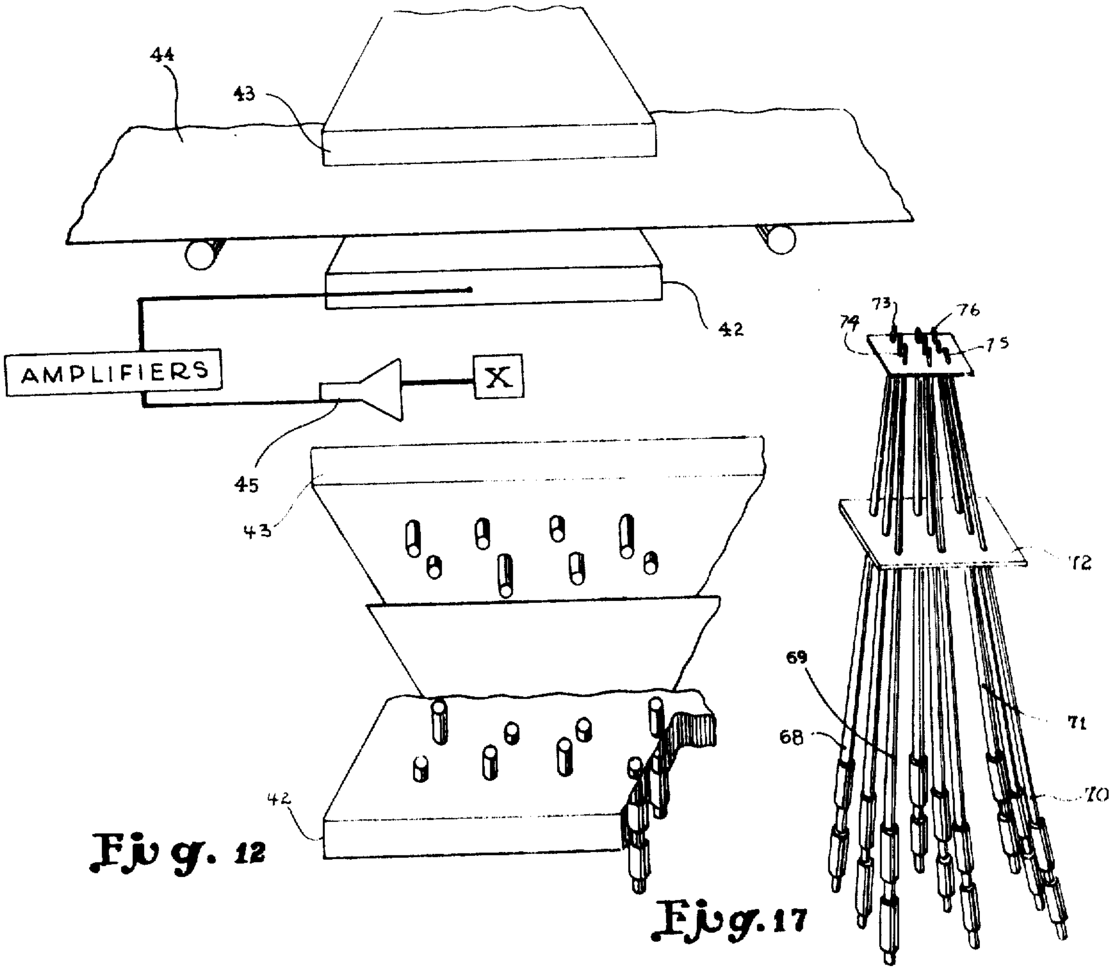
Fig. 12 Fig. 17
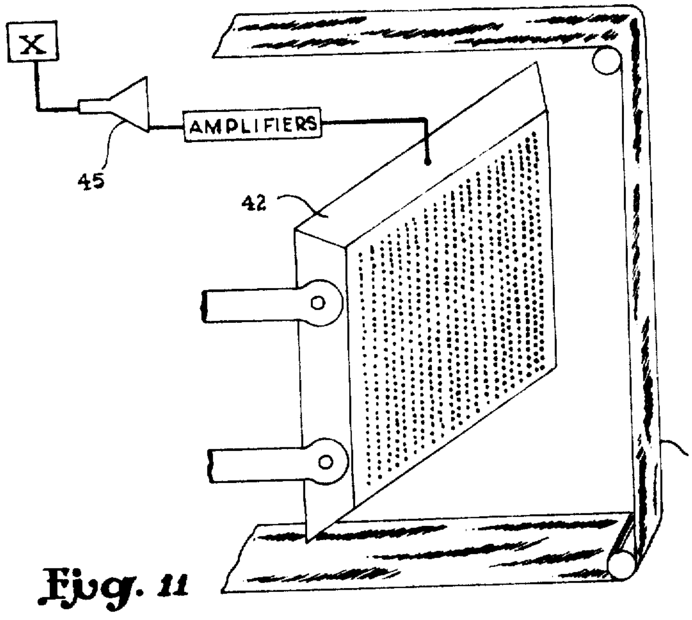
Fig. 11
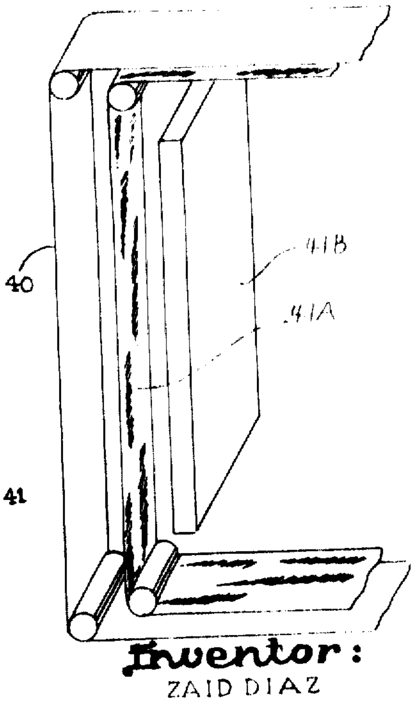
Inventor:
ZAID DIAZ

Inventor:
ZAID DIAZ

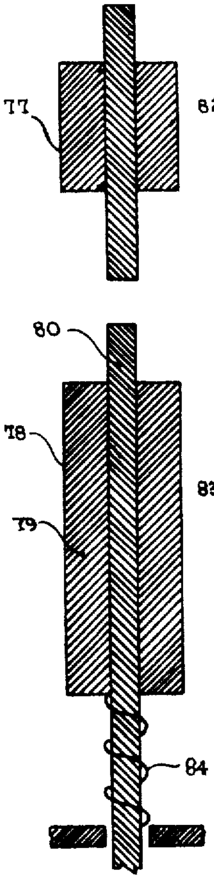
Fig 18
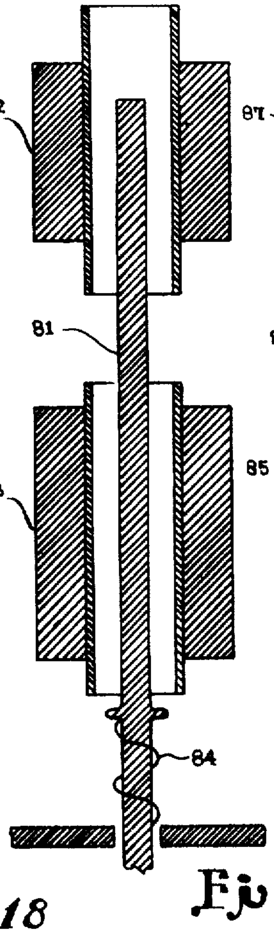
Fig. 19
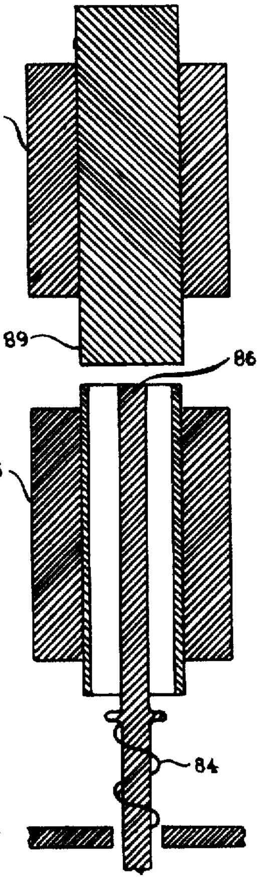
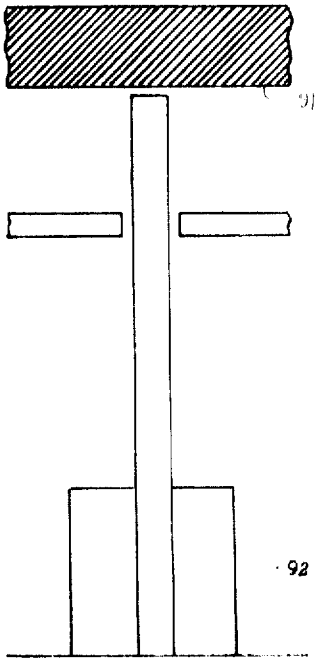
Fig. 21
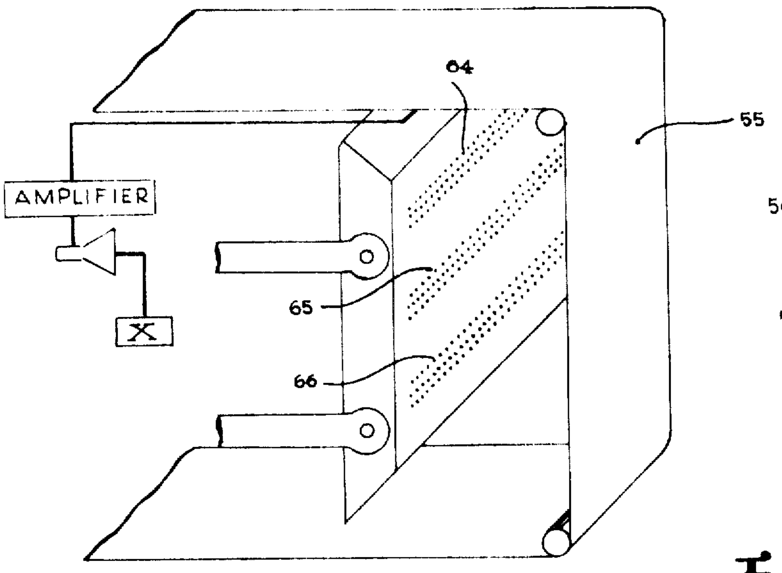
Fig. 15
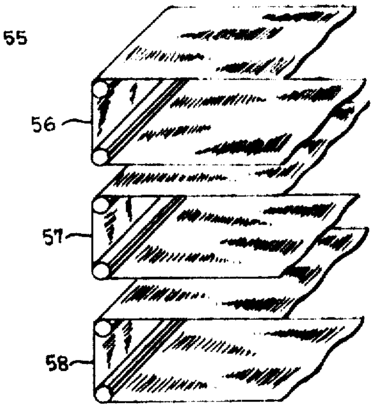
Inventor:
ZAID DIAZ

APPARATUS FOR CONVERTING CATHODE RAY PORTRAYABLE INFORMATION TO SPACIAL IMAGES

A TV camera tube, such as a vidicon, is carried by the blind person, for example on top of his head or in his hand, and oriented ahead of him to pick up continuously moving images of the normal vision field ahead of the camera tube.

Means are provided for scanning each image and converting it to a sensual map or outline of the field viewed. The scanning may be conveniently effected according to the orthogonal axis system wherein coincidence provides an indication of an image point impression on, for example, the back of the user.

An electromechanical pressure pad comprising perhaps 10,000 movable rodlike elements is strapped to the user's back and the individual rod elements are actuated in accordance with the scanning. For example, heavy pressure may be employed for dark areas and the pins or rods are urged strongly against the back in such areas, whereas light areas may be portrayed by light pressure, or vice versa. Moving objects, or course, reproduce as a pressure "outline" moving across the user's back. For example, suppose the TV camera tube picks up a dog running across the path of the user, then a pressure image in the form of a dog moving across the back will be transmitted.

The essence of the invention may readily be appreciated if one envisior^ a stranger marking a number "4" on his back, for example by using his finger tip. Certainly, the stranger need not advise the person what was marked on his back for the person will instantly know that the configuration was that of a "4." This is true of persons with normal vision, persons who have been blinded, and persons who have been blind from birth, never having had the power of sight.

Thus, by utilizing the sensational technique, the invention enables an optical to spacial image conversion.

In lieu of the sensual pad for reproducing on the back of a person, the pad may comprise a dot printer, for complete pages of a newspaper or the like. This may be achieved directly by tipping the rodlike elements with marking material or by utilization of tiny electrical currents of relative magnitudes in accordance with the image at the rodlike elements, which technique may also be useful in connection with an individual's skin, but to date the pressure response has proven to be the best approach.

Similarly, by increasing the strength or force behind the movement of the rodlike elements, metal may be formed in accordance with an optical image or other control signals (e.g., computer outputs).

The conversion of the information to be portrayed into electromechanical or other useful form is conveniently accomplished by employing the beam of one or more cathode ray tubes. For example, the optic image may be scanned or the information may be utilized to modulate the beam of one or more cathode-ray tubes such that the cathode-ray beam "image" is scanned, point by point, and the signals developed thereby are converted into the coordinates for the output device. As a matter of fact, cathode-ray tubes with a single line of scanning will suffice provided that two are employed, one for the X scanning and one for the Y scanning and the pickup elements may be a series of target plates, photo diodes or resistors, phototransistors or other transducers. By utilizing a coincident system, a pair of solenoids may be employed collectively to operate each of the rodlike elements. For example, in an arrangement employing some 10,000 rods, i.e., a matrix of 100 by 100, each row would be represented by a single detector wherefrom 100 solenoids would be energized on for example the X axis scan. Simultaneously, the Y axis being scanned would energize 100 solenoids, but there would only be one point of coincidence wherein both solenoids of a single rod would be energized to convert the electrical information into a mechanical or other form (e.g. electric potential points, heat points, etc.). In this way, then the entire information or image is scanned and converted into the output information or mechanical spatial picture desired.

Thus, this invention relates to a new and useful device that will convert an optical image or, in any event, cathode-ray projectable information into a mechanical pressure image of that information.

It is an important object of this invention to produce a device that will allow a human being to perceive an image without the use of the sense of sight. It is further intended to allow a sightless individual to perceive moving or stationary forms and objects through the use of his sense of touch or the peripheral nervous system.

It is a further object of this invention to produce a device that will allow a signal reproducible as an image in a cathode-ray tube to be converted into a pressure image that may thus be printed in any media at high speeds in contradistinction to the present use of photographic emulsion media and other special media for the transferring of images from cathode-ray tubes, the relatively low speed at which these may be printed, and the time and precessing required to develop or obtain the printed image by present methods.

Another object of this invention is to produce a device that will convert signals and information originated by closed circuit television cameras, electronic computers, television transmitters, radar systems, and any other information originating device whose output may be portrayed in a cathode-ray tube, into a pressure image what will contain a substantial portion of such information.

It is a further object of my invention to produce a device that will allow a sightless person to sense images or forms which are representable in the form of light in contradistinction which are representable in the form of light in contradistinction to devices that require any type of transmission or emission, such as emission from the device of electromagnetic waves or sound waves for their operation.

Another object is to enable the sightless person to perceive the motion of any object representable in the form of light or any other type of electromagnetic wave.

It is a further object of this invention to produce a device that will allow a sightless person to perceive objects through the peripheral nervous system in contradistinction to devices that may utilize the brain, cranial nerves, or optic nerves as the receiving media.

It is also intended to communicate these images to the sightless person without the application of surgery, in contradistinction to methods that may necessitate cutaneal or subcutaneal, external or internal surgery for its application or utilization.

It is a further object of this invention to produce a device that will allow a sightless person to perceive forms and patterns in contradistinction to devices that will allow them to perceive points of a pattern at a time.

It is also the object of this invention to produce the first practicable device that will allow sightless persons to perceive motion, patterns, and forms.

It is a further object of this invention to produce a device that will convert a cathode-ray tube projectable image into a pressure image that may be used for the forming or deforming a sheet metal, plastics or any other materials.

It is a further object of this invention to produce a device that will convert a cathode-ray tube projectable image into a pressure image containing a substantial amount of the cathode-ray image information to be utilized in any form whatsoever.

In accordance with the above aims, my invention consists of any suitable information producing or transducing mechanism or information gathering or transmitting device or mechanism, from which an electric signal may be applied to a cathode-ray control circuit. It further comprises a cathode-ray tube control circuit. It further comprises a cathode-ray tube control circuitry, an electronic cathode-ray tube containing an electron gun and a set of suitably placed receiving plates on the face of such tube, electric connections from each of the receiving plates to a plurality of electromagnets activated thereby, said electromagnets being placed in such a configuration that when the cathode-ray beam impinges on a particular point on the face of the tube, a particular electromagnet, or suitably designed piece of matter, or part attached or close thereto, is moved to produce a mechanical displacement, pressure or vibratory movement at a point corresponding to the point in the face of the tube where the cathode beam impinged.

The invention is practical and easily manufacturable even when compared to current sonar or radar-type devices which do not produce an image. The realization of the invention resides in the fact that enough points of relatively simultaneous information are transmitted in large enough numbers to constitute an image. As an example in a related art, a series or group of photocells is generically different from a vidicon tube due to the nature of the transmission of a series of images in the case of the vidicon versus the transmission of unrelated point light sources in the case of the photocells.

In a similar manner in this invention the continuity effect of the series of images and the large amount of utilizable information transmitted is obtained at the expense of the lack of "-continuousness" of the particular point signals, thereby providing a higher utilization of the circuitry and channels of transmission by discontinuously transmitting each particular point in an image through a sampling technique similar to that used on television scanning. As an example, in a 1,000 ×1,000 point image a one to one connected mechanism using photocells or other types of individual sensors would require at least 1,000,000 connecting circuits, wherein in this new mechanism described herein only 2,000 would be required to transmit an amount of information undistinguishable, for the purposes utilized, from the usable information transmitted through 1,000,000 connectors. Considering that connectors are required on an average transmission of information for one point, the ratio of circuitry quantity or channel capacity from the single point direct transmission to the method described herein is in the proportion of $cn^2/cn$ or $n:1$ for $n$ point transmissions. The cost, weight, size and complexity would be increased at a very similar ratio and the reliability would decrease accordingly. In this sense, this invention is of a completely new and higher degree of utility in changing electrical energy information to mechanical energy information. In this way it will now be practicable to transform any type of image or large information complexes into printed, indented forms or sensorial data at a very low cost, with higher reliability and at very high speeds. A transducing function of a higher degree of information capacity in relation to complexity, cost and other factors is herein described.

The rates at which different continuous frames or static images may be so transduced as described herein is limited only by the reaction time of the electromagnet. Other limitations in the amount of deliverable information and rate of delivery are established by the input devices and their circuits, and by any auxiliary circuits such as amplifiers and discriminators that may be attached or added to the basic matrix configuration.

Further objects and advantages other than those above set forth will be apparent to those skilled in the art, from the following description when read in connection with the accompanying drawing in which:

FIG. 11 shows, in perspective, a possible application of the present invention to the printing field;

FIG. 12 is a view, in perspective, to show the invention applied to metal forming;

FIG. 15 shows, in perspective, a schematic arrangement of a printer adapted for sequential color reproduction;

FIG. 17 is a view, in perspective, to show an arrangement for nesting a plurality of rodlike elements and their associated solenoids for improved resolution in the printing application of the invention;

FIG. 18 is a view in cross section of two separate embodiments of the rod elements with actuating solenoids;

FIG. 19 shows in section an alternative arrangement of an electromagnetic rod actuating arrangement;

FIG. 21 shows, partly in section, a coil arrangement where no springs are necessary or no magnetic return mechanism is necessary, to fulfill the requisite function.

In the foregoing explanation the term cathode-ray image and cathode-ray beam portrayable image will be utilized in reference to the information carried or capable of being carried or communicated through the position and magnitude variations of a cathode ray in space. The cathode-ray beam image can also be visualized as the electron energy or electron density distribution in a cross section of space near or into which a cathode-ray beam is directed or is in operation. Its detection herein is treated both in its aspect of location and magnitude at a particular instant, as well as its distribution over a period of time. The term cathode-ray beam information pertains to such information as when such information is applied to a cathode-ray tube in the proper manner, it is capable of producing a cathode-ray image containing a significantly large amount of said information in terms of location and/or magnitude.

The term effect image is used through this explanation as a combined series of points in space or on an object or person that when taken together as a unit, comprise complex intelligence in some observable or measurable form, state, positioning, or energy such as pressure, movement, vibration, or any other observable effect.

Figure 1:
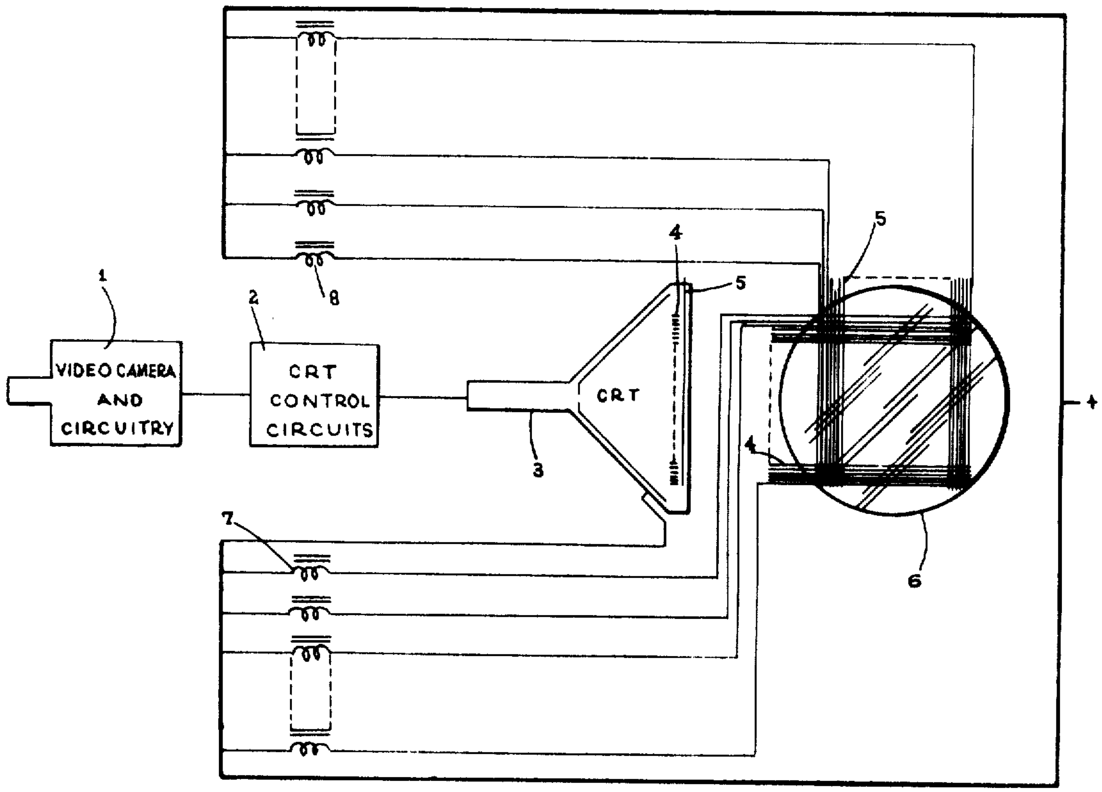
FIG. 1 is representative of the basic electrical circuitry, as shown partly in block form, for transducing an optical image to electrical signals.

FIG. 1 illustrates in diagrammatic form, the general parts comprising a preferred configuration of the invention. This configuration utilized any video camera 1 to supply a conventional video signal to a set of conventional cathode-ray tube control circuits 2. These circuits 2, in turn, control a conventional cathode-ray gun 3. The electron beam will follow a path that will make it impinge on the face of the tube. The face of the tube contains orthogonally oriented electrodes 4 and 5 which being positively biased will carry the electron beam charge through independent sets of electromagnets 7 and 8.

Figure 2:
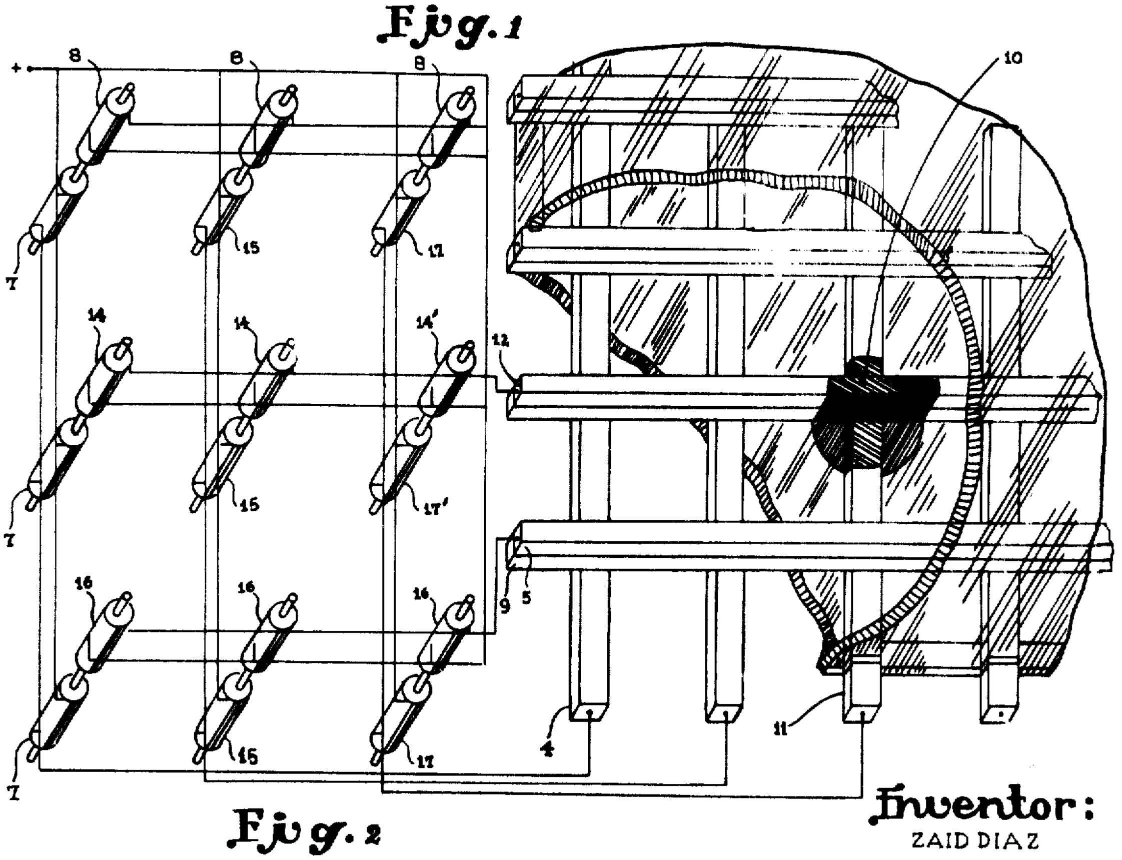
FIG. 2 is a view, in perspective, partly broken away, to show the double solenoid rod actuators connected to a portion of a matrix.

In FIG. 2, a closer schematic detail of a possible configuration of the electrodes and electromagnet sets is represented. An electron beam spot impinged area 10 will cause an electric current to flow through those electrodes 11 and 12 on which it impinges because the area 10 of the beam is sufficient to distribute electrons to the electrodes 11 and 12 thereby causing separate currents to flow in the circuits associated therewith. This is true because the beam area, as indicated at number 10 in FIG. 2, is greater than the common area or overlapping insulated junction of the electrodes such that both electrodes receive electron current whereas no adjacent junction of any other electrode receives the electrons from the beam coincidentally therewith. So long as the beam area 10, or its diameter, is greater than the width of either electrode 12 or 11, the other electrode must receive a current therefrom. Further, as long as the diameter or area 10 is less than the spacing between the adjacent electrodes, when it is caused to impinge therebetween, no electron flow is transmitted to either adjacent element or electrode. The current from the horizontal electrodes 12 will flow through the electromagnets 14 connected to that electrode's terminal. This current will create a polarity in all electromagnets belonging to that set. The same action will occur with the vertical electrodes 11 and its set of the electromagnets 17. The polarities of the horizontal sets of electromagnets and the vertical sets of electromagnets are oriented so that when activated they will repel each other.

In the example shown in FIG. 2, electrons being impinged in area 10 will activate the set of electromagnets 14 from electrode 12 and the set of electromagnets 17 through electrode 11, creating opposite polarities in the electromagnets in sets 17 and 14. Of all the electromagnets shown in the diagram only electromagnets 14' and 17' will tend to repel each other due to their closeness and because of the difference in their polarities Because of their orientation and relative positions all other electromagnets will remain in their original positions and conditions and will not be significantly repelled (if anything, they will be attracted) by the electromagnetic fields produced by sets of electromagnets 17 and 14.

FIG. 2 also illustrates a method for insulating the horizontal and vertical electrodes by the placing of suitable insulating, or spacing material 9 between the horizontal and vertical electrodes.

FIG. 2 also illustrates a configuration essentially as described above but where the horizontal and vertical sets of electromagnets are oriented so that when activated they will attract each other rather than repel each other. In this case the movement of the electromagnets will be in the opposite direction as in the case described above, with the difference that approximately half of the attraction of the electromagnets 14 and 17 will also appear between the row of electromagnets 14 and its corresponding complimentary electromagnets and the row of electromagnets 17 and its corresponding electromagnets, therefore reducing the proportional effective magnitude of the mechanical signals in the mechanical movement output.

Figure 3:
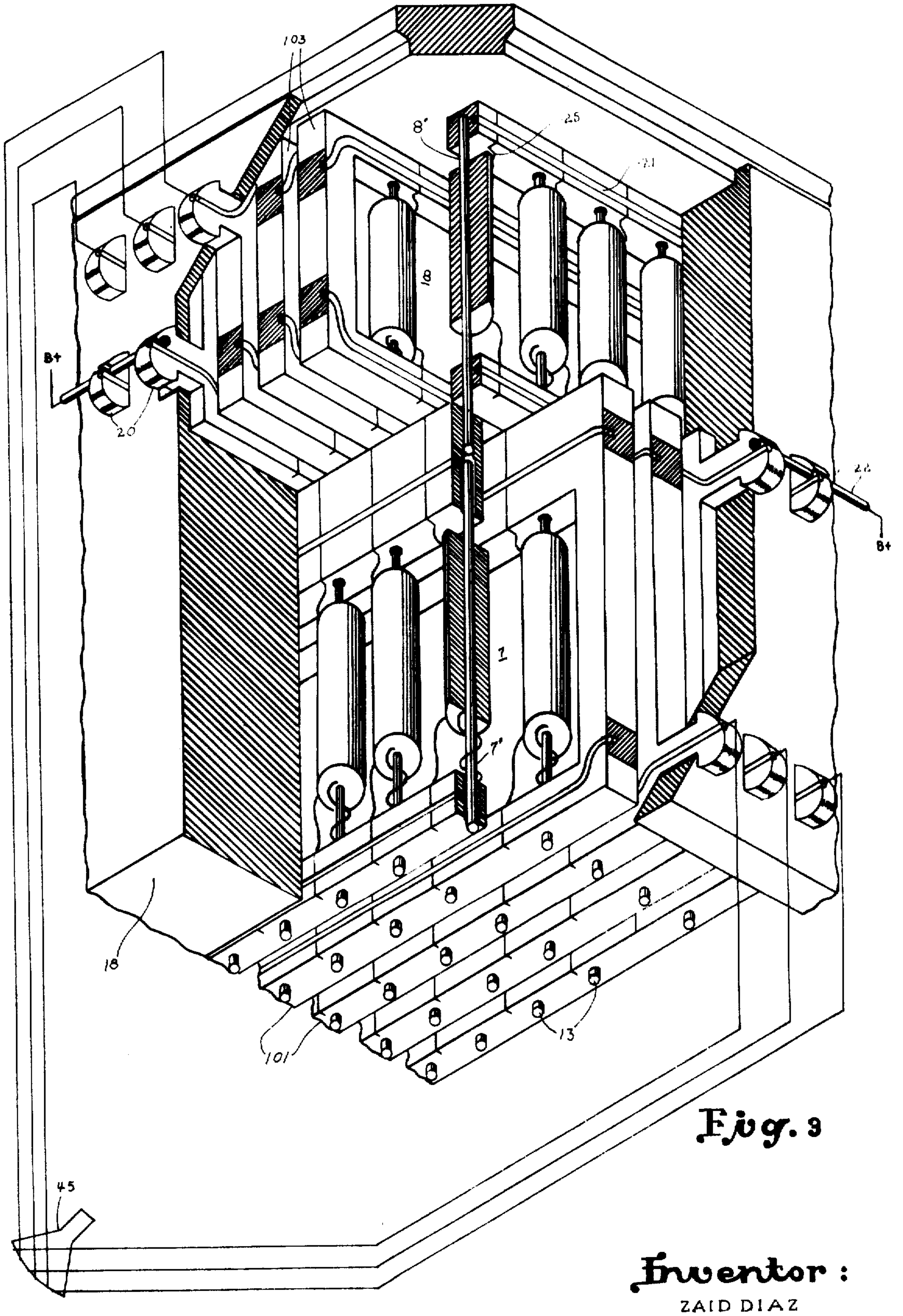
FIG. 3 is a view in perspective, partly broken away, to show a preferred embodiment of the structure associated with the rods and electromagnetic means for operating the same.

FIG. 3 illustrates the mechanical position and possible construction of the electromagnet matrix. The matrix is held in place by a suitable constructed piece 18 of plastic or any other suitable material. Within it are contained the horizontal and vertical sets of electromagnets 8 and 7. The electromagnets 8 of one of the types of sets will be attached so as to have a certain degree of freedom of movement and oriented in such a manner that the activation of its corresponding electromagnets in a set of different type of orientation simultaneously with its own activation will allow it to move, vibrate, or exert a pressure. Fig. 3 also illustrates one of the many ways in which the sets of electromagnets may be mechanically held and electrically connected so as to simplify their construction.

The matrix is held in place by a suitable constructed plate 18 of plastic. The assembly is adapted to snap together and to come apart for servicing. It comprises wafers, such as 101, which carry one set of windings 7 and wafers, such as 103, which carry the other set of windings 8. The core 8' for one of the windings 8 is fixed in frame 103 against movement. However, the core 7' in one of the windings 7 is movable. If winding 7 only is energized its armature 7' will tend to attract itself toward armature 8' and thus no downward movement is experienced externally of the matrix. However, if both windings 7 and 8 are coincidentally energized, like poles are produced at their adjacent ends to force armature 7' outwardly of the matrix to perform its sensory or other function.

Figure 4:
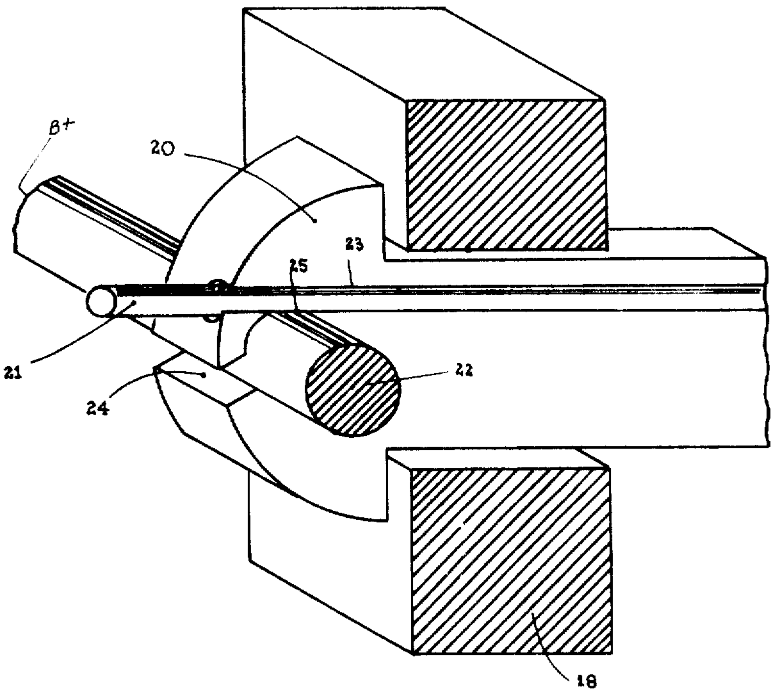
FIG. 4 is a view in perspective, and partly in section, to show structure for building the matrix.

FIG. 4 shows in detail how a particular embodiment of this invention may be mechanically and electrically constructed. The frame on which a set of electromagnets is mounted may have one or more protuberances 20 that could be easily plugged through the outside frame 18 thereby holding the sets 7 and 8 (FIG. 3) mechanically to the frame 18. FIG. 4 also shows how electrical wires 21 and 22 are easily slipped through indentations in the material of the electromagnet frames 23 and 24 in order to establish electrical contact without the need of soldering or other complicated operations. The main supply or bus lead 22 is clamped between the plastic jaws of protuberance 20 in fixed location. Similarly, the individual coil supplying wire 21 is clamped into position in contact with bus 22 to maintain sufficient connection for the electrical supply, bus 22 being connected to B plus as is seen in FIG. 3.

Figure 5:
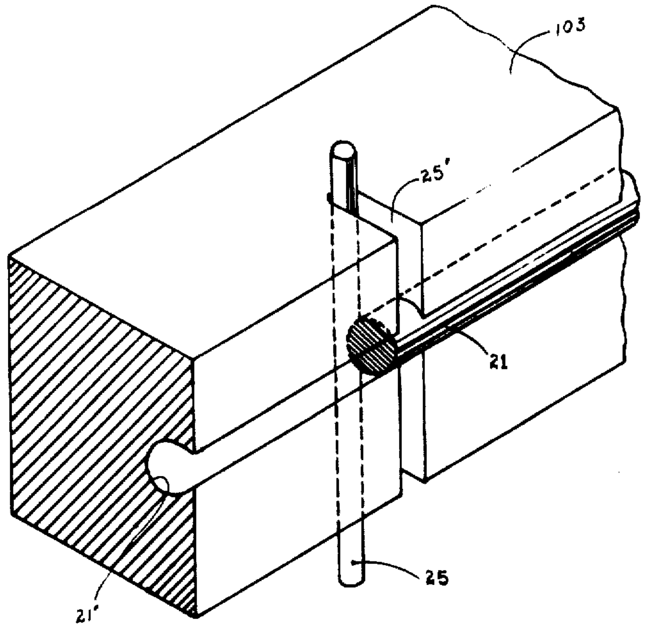
FIG. 5 is a perspective view of suitable structure to be employed with each electromagnetic coil.

FIG. 5 illustrates how the same principle is applied in the connections from the wire 21 in the frame and the wire 25 conducting electricity to each particular electromagnet in the set in a particular embodiment of this invention.

The structure of FIG. 5 comprises a portion of one of the wafers 103 and shows the recess 21' for wire 21. The individual lead 25 is a direct solenoid or coil wire and is maintained in contact against winding supply wire 21 through slot 25'. In this manner, all parts may be plugged together for assembly or unplugged for quick disassembly.

Figure 6:
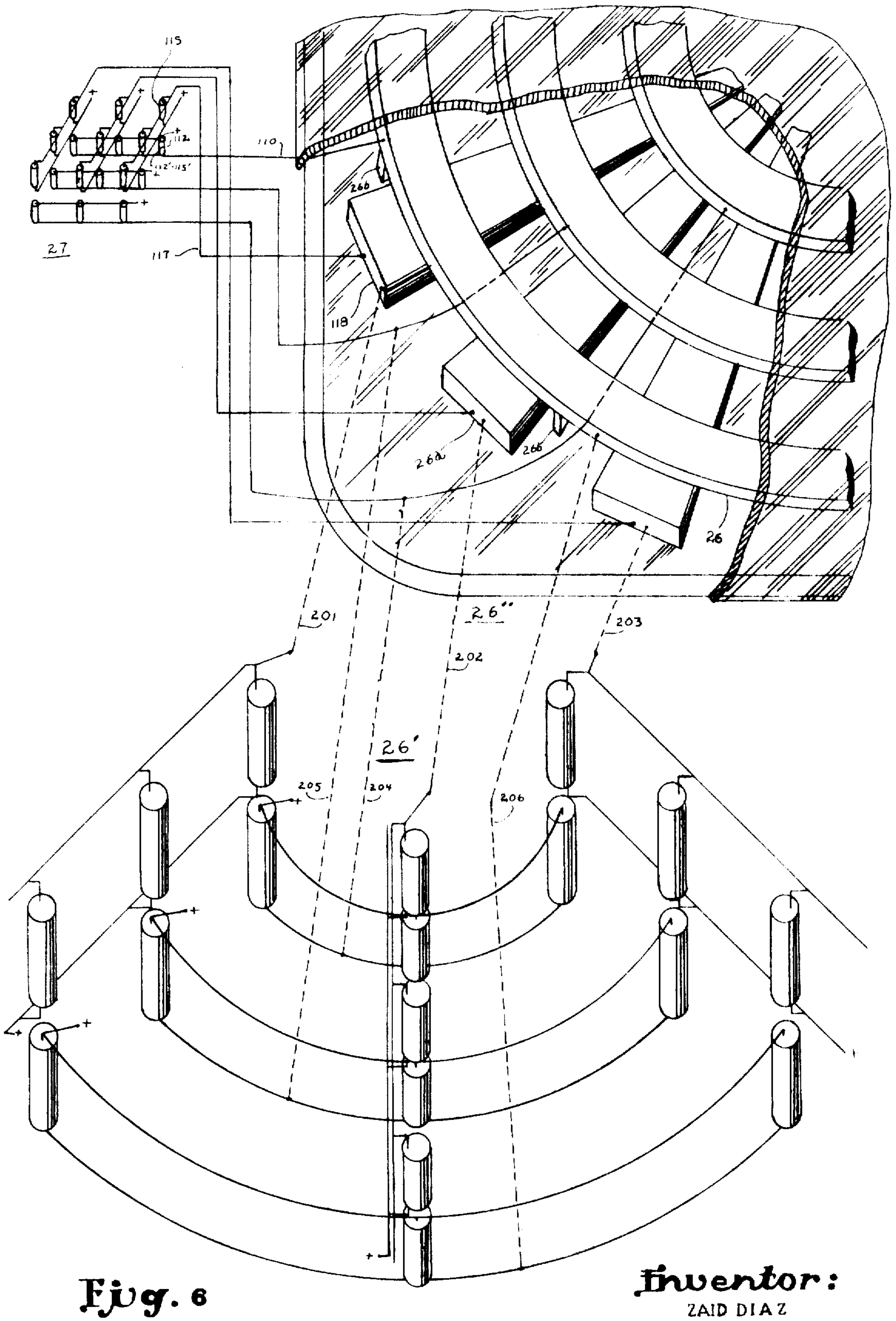
FIG. 6 is a view, in perspective, of an alternate approach to a matrix, of the nonorthogonal type.
Figure 10:
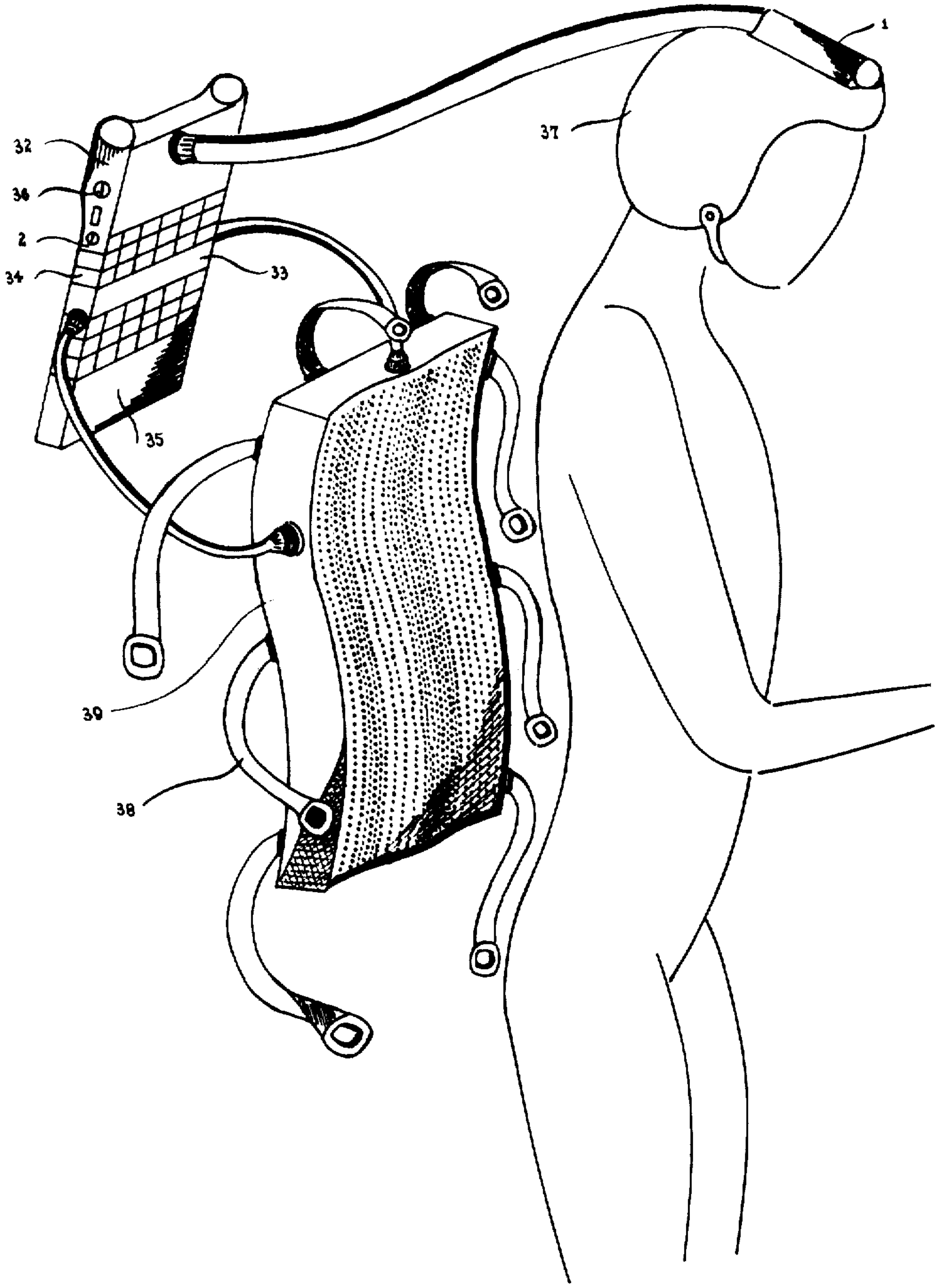
FIG. 10 is a view in perspective of a user and the equipment of the present invention for the purpose of enabling the user to perceive ahead.

FIG. 6 illustrates different coordinate systems which may be used other than the horizontal and vertical method mentioned in the previous embodiment of this invention illustrated in FIGS. 1, 2 and 3. It also illustrates that the arrangement of the matrix on the face of the tube is independent of the type of sampling or scanning as well as of the type of signal being transmitted to the cathode-ray tube control circuits or to the cathode-ray tube electron gun. FIG. 6 also illustrates that the configuration of the electromagnet matrix is also independent of the configuration of the matrix of electrodes on the face of the tube. In this particular configuration a circular or polar arrangement 26'' of electrodes 26 is combined with a cartesian electromagnet arrangement 27. As a usable application of this principle, in the particular embodiment of this invention to be utilized to communicate information to sightless individuals, the electromagnetic matrix will be constructed on a coordinate system that will not necessarily contain straight lines and which may be contoured in all three dimensions to conform to the body of the person and/or to the region of the body where it would be applied, as shown in FIG. 10.

The circular electrodes 26 are conductors separated from the radial conductors 26*a* by suitable spacers 26*b*. By way of example, lead 110 extends from outer circular electrode 26 to a set of coils generally designated at 112, which coils are energized when the electron beam strikes electrode 26. Associated coils 115 are energized over lead 117 from radial electrode 118 and when these electrodes are coincidentally energized, the single electromagnet 112'—115' is sufficiently energized as to move its armature to exert pressure.

Similarly the circular or polar arrangement of electromagnets 26' can be employed with either type electrode matrix, since each electromagnet is common to only two sets of conductors.

The dotted leads are shown extending from the polar coincidental matrix 26'' to the polar electromagnetic matrix 26' as alternatives to the use of the matrix 27. The leads 201,202 and 203 extend from the radial electrodes and the leads 204,205, and 206 extend from the circular electrodes to the straight line matrix leads and the circular matrix leads respectively, in order that the operation will be the same as heretofore explained.

It should be noted that the insulation shown in FIG. 6 underlies the upper or radial electrodes 26. In this manner the beam may fall coincidentally on two electrodes. Obviously, the two sets of electrodes comprising the matrix may be spaced apart so that the vacuum of the tube comprises the insulation, but in no event may the insulation overlie the lower electrodes 26A.

Figure 7:
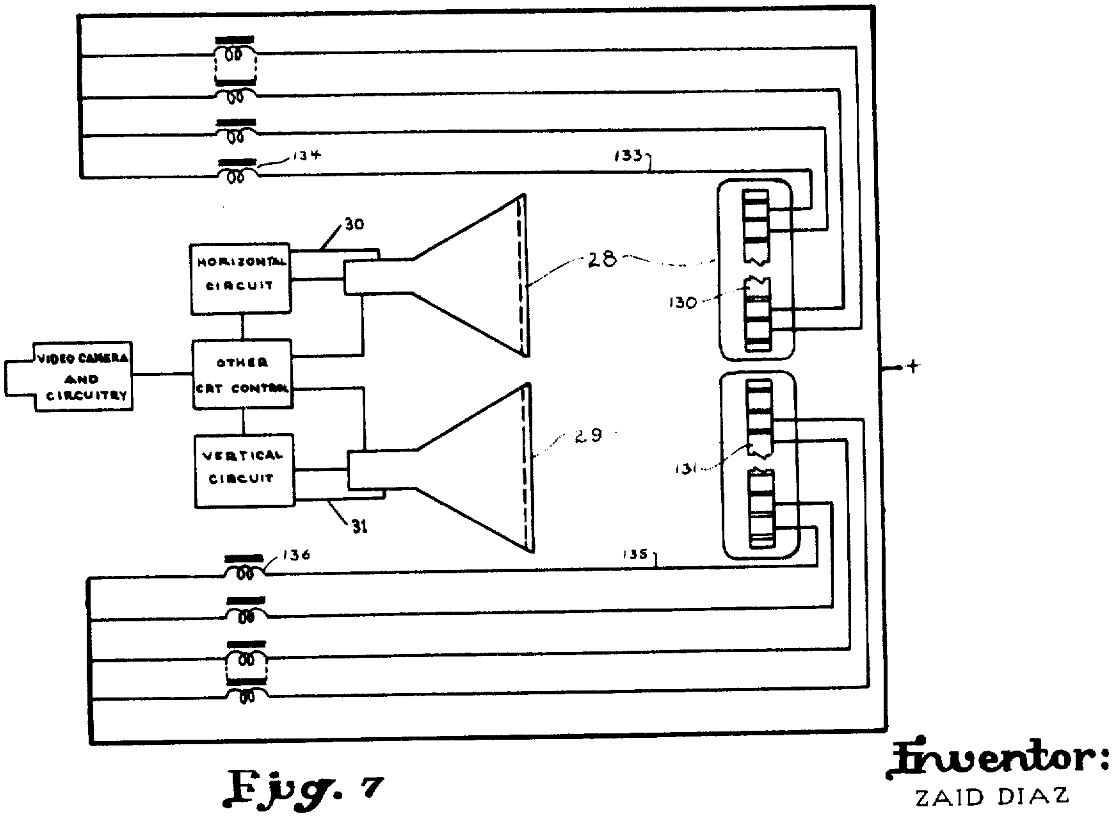
FIG. 7 is partly schematic to show electrical components and an electrical circuit for employing a pair of cathode-ray tubes with single scanning plates for converting picture information into X and Y coordinate information.
Figure 8:
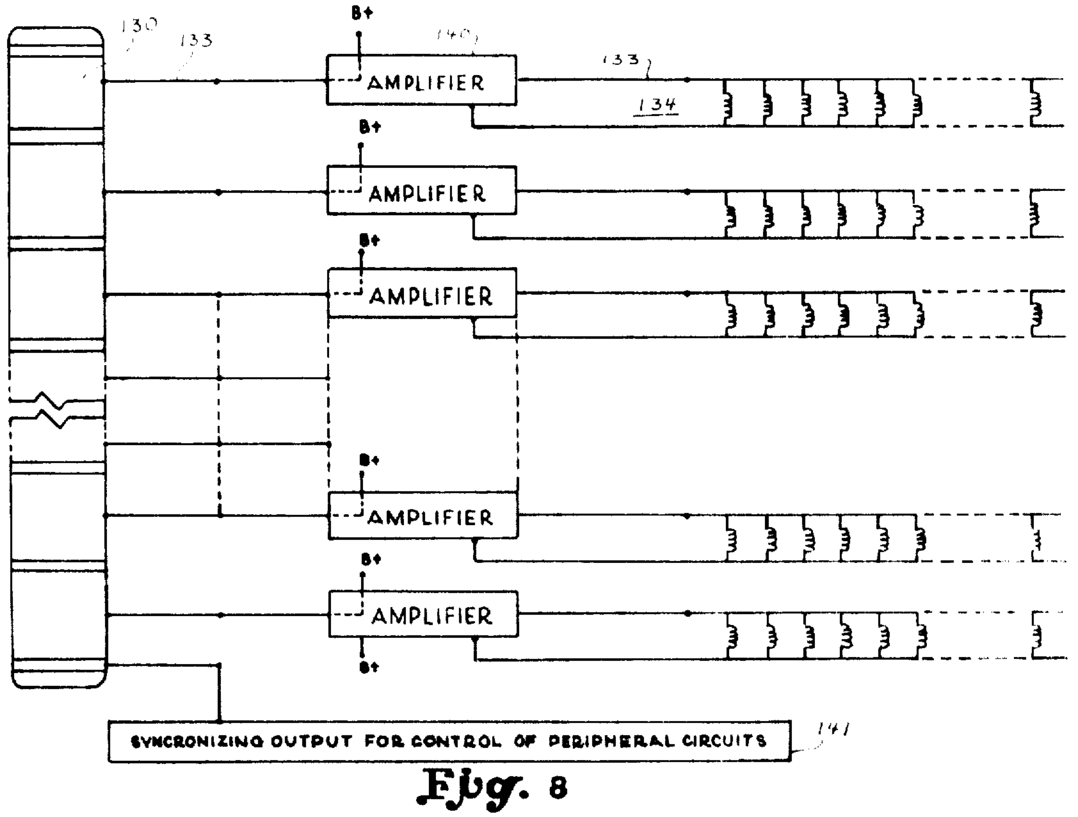
FIG. 8 is an electrical diagram to indicate the array of electromagnetic coils which are energized for each scan, along with their interconnections with transducers of the plate type for cathode-ray scanning.

FIG. 7 illustrates an embodiment of this invention where each of the two sets of coordinates used in the electrode matrix is separated into different cathode-ray tubes 28 and 29. In this particular embodiment, the horizontal and vertical components of a cathode-ray beam movement are transmitted and controlled independently by applying the vertical deflection signal to one of the sets of plates and the horizontal signal to the other set of plates. The construction of the horizontal and vertical matrix components 130 and 131 are therefore simplified by reducing the length of these electrodes, as shown in both FIGS. 7 and 8. On a matrix of, for example, 100×100, each electrode 130 and 131 would comprise 100 separate plates or other transducers with a connection such as lead 133 to a set 134 of 100 electromagnets. Similarly, electrode 131 would have each of its plates connected, as for example by lead 135 to sets 136 of 100 electromagnets. Thus, at any given time regardless of where the vertical and horizontal beams are, one electromagnet would be coincidentally energized by both beams scanning electrodes 130 and 131. In FIG. 8 the plates or transducers are shown as the electrode element 130 with, for example, lead 133 extending by way of amplifier stages 140 and thence to the set of coils 134. This pattern is simply repeated for each of the individual plates or transducer elements making up the electrode 130. The synchronizing output for control of peripheral circuits, shown as block 141 is an end of line output signal, if even required.

Figure 9:
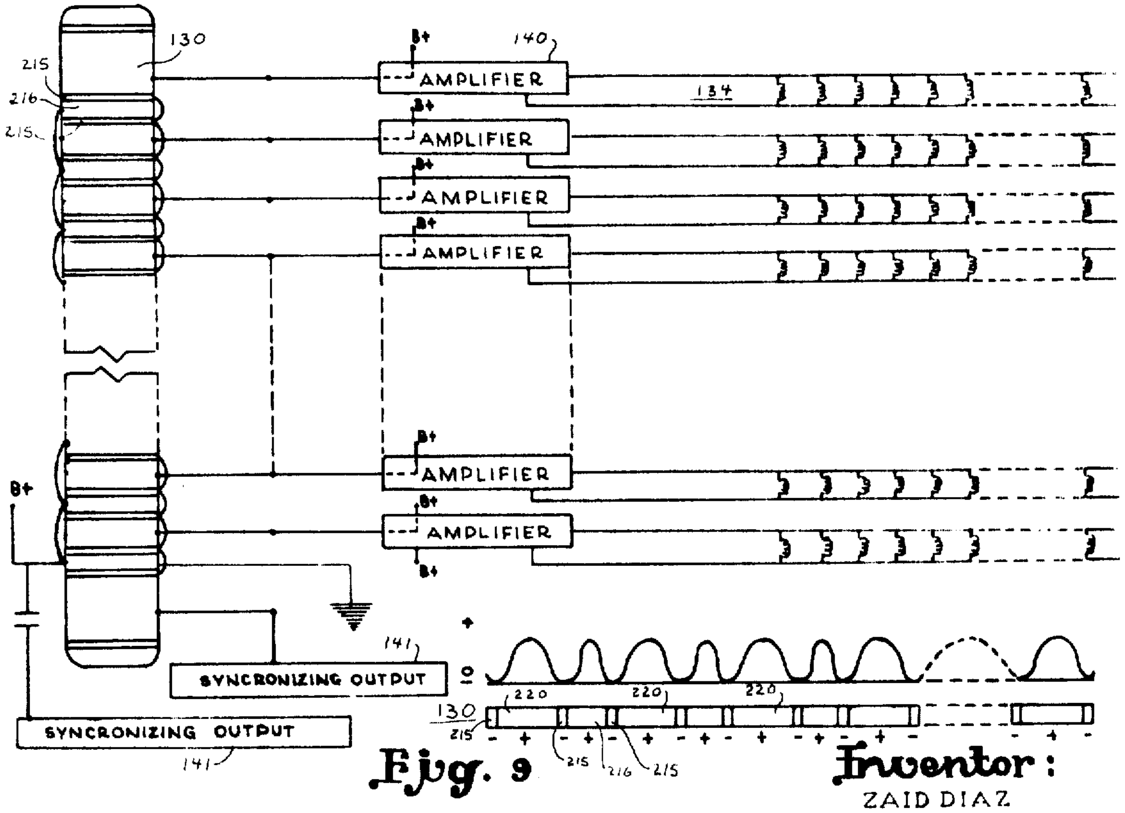
FIG. 9 shows an electrical schematic diagram which is a substitute for the diagram of FIG. 8 in which plates are employed for scanning purposes, but are separated by bias potentials for better signal discrimination.

FIG. 9 illustrates another embodiment of this invention where the vertical or horizontal sets (130) of electrodes are separated by three electrodes 215,216,215 carrying negative (grounded), positive and negative (grounded) biases that will allow greater discrimination and separation of the signal as shown in the lower right of FIG. 9. FIG. 9 also illustrates how in another embodiment of this invention, amplifiers, such as 140, may be placed between the electrodes in the cathode-ray tubes and the sets electromagnets in order to increase the power reaching the electromagnet matrix to allow for greater output in movement, strength and pressure or to allow for a larger quantity of electromagnets in the sets such as 134, as well as to control electromagnetically the currents reaching the electromagnet matrix.

It also shows synchronizing outputs for "end of line" or "endofframe" determination if even required, such as for printing or the like, as an interrupt signal for computer use.

The increase in discrimination is best explained by viewing the potential distribution across electrode 130, as depicted at the lower right side of FIG. 9. The individual plates of the target electrode 130 are shown at 220 and they are separated by the three additional electrodes 215,216 and 215; the electrodes 215 being grounded or at negative biasing potentials and the electrode 216 at a positive potential which may be the same as the individual plates 220. The three electrodes 215,216, and 215 serve to space the target plates 220 from each other sufficiently that the cathode-ray beam cannot overlap on plates 220. Additionally, due to the negative biasing potential, this action is enhanced, as the beam is prevented from falling on the negative areas.

FIG. 10 illustrates a particular embodiment of this invention as it could be used to perceive visual images from the surroundings by a blind person. In this figure, the signal generated by the TV camera circuitry 1 is transmitted to the CRT control circuits 2 in the instrument pack 33, which carries a cathode-ray beam tube and electrode matrix 32, amplifiers 34, batteries 35, and other instrumentation, controls 36 and switches. FIG. 10 also shows, one of the many ways in which the television camera 1 can be attached to the body (head for example) 37, and how the electromagnet matrix 39 may be attached to the body by straps 38 or any other suitable materials. The uneven distribution of the rodlike elements is occasioned by the contouring of matrix 39 to fit the curvature of the back.

FIG. 11 shows how a different configuration of this invention may be used to print on any type of material 40 information or images portrayable in a cathode-ray tube 45 produced by any means or device whatsoever X by interposing an ink imbedded material, i.e. a carbon ribbon 41, or similar material between the electromagnet matrix 42 and the material 40 on which the impression is to be made. The ink material 41A may also or alternatively be placed between the material to be printed and the platen 41B. The platen itself may be ink imbedded to eliminate the need for carbon ribbons or similar materials.

FIG. 12 illustrates another embodiment of this invention where the electromagnet matrix 42 is used to bend or from any material 44, by placing said material between the matrix 42 and a plate or any conveniently flexible backing material 43. This backing material 43 could be substituted for by another electromagnet matrix in which the polarity of the types of the electromagnet sets are reversed in order to create in this second matrix 43 a negative image of 42. This reversing of the electromagnet movement may also be accomplished by applying a reversed (negative image) signal to one CRT circuit and a positive image signal to another.

The input of information to the cathode-ray tube 45 and electromagnet matrix 42 could again originate in a computer, TV camera, or any other device that could produce information to a cathode-ray tube.

Figure 13:
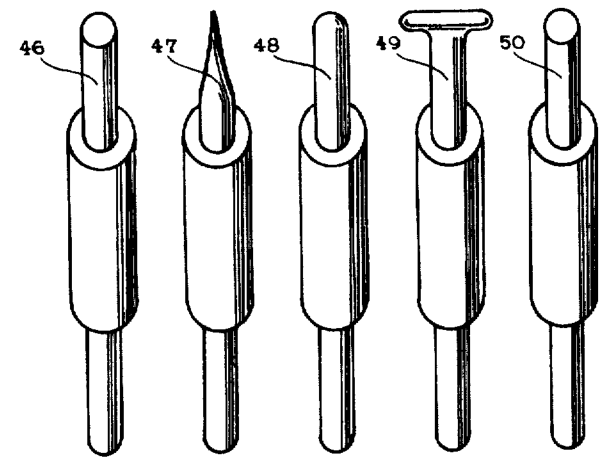
FIG. 13 is a view, in perspective, of alternative structures of the rodlike elements.
Figure 13:
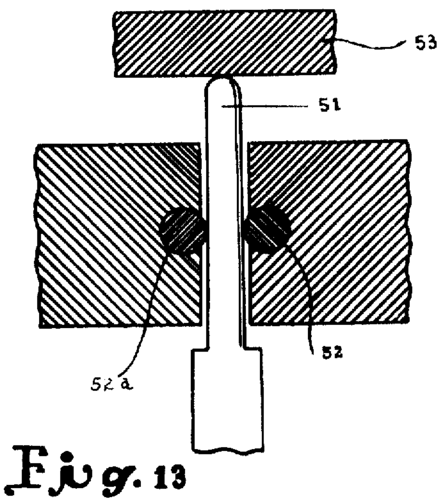

FIG. 13 illustrates some of the innumerable number of configurations of the electromagnet tips and illustrates some of its uses. Tip 46 is a basic tip of very inexpensive rod-type construction for general use. Tip 47 illustrates a pinpoint tip that could be used for making pinpoint holes or indentations, or transmitting sensorially receptive stimulae, such as pain or electric potentials. Tip 48 shows a round headed tip for general uses. Tip 49 illustrates a flat headed tip, convenient for forming and other operations. Tip 50 illustrates a pin having a die at its end for punching holes. Tip 51 is illustrative to show how wires 52 carrying an electric current and having an electrical potential can be used to transmit said potential to a surface 53 once the tip is activated into motion. Tip 51 is also illustrative of a way in which the tip 51 may be used as the conducting portion of a switch connecting a conductor 52 with a second conductor 53 when activated. The connection may also be accomplished by connecting conductor 52 to conductor 52*a*. A "leveled" connection may also be accomplished by connecting input 52 with output 52*a* for small signals, and with 52*a* and 53 simultaneously for larger signals.

Figure 14:
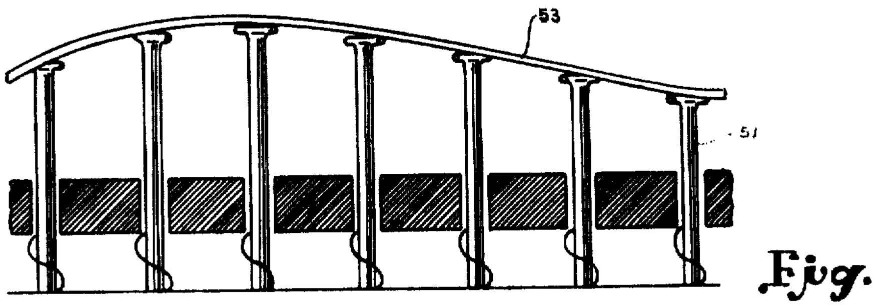
FIG. 14 shows, partly in elevation, and partly in section, an arrangement for converting a dot-type output to a continuous surface output.

FIG. 14 illustrates again how any material, such as surface 53 of FIG. 13 can be placed in contact with the electromagnet pins 51 and between the matrix and material to be touched, moved or shaped and how this interplaced material can in turn be used to transmit a more even pressure to whatever material, thing or person is placed in contact with it.

FIG. 15 illustrates another embodiment of this invention where information received, transduced or originated in any device X is translated by the apparatus of this invention into a pressure image which will cause any material such as paper 55 to come sequentially in contact with several ink embedded materials 56, 57, and 58 each embedded with a different color substance so as to produce a multicolor image, form or design, in the material 55. Preferably, the material 56 is moved against the paper 55 and the color 64 printed, the paper moves to color 65, and material 57 moves in to print the next color, the same operation obtaining for the third color and image. Conventional conveyor movement and registry techniques may be employed with this principle. As a practical application of this embodiment of the invention it could be used for the transmission through regular electromagnetic channels, such as television channels, colored images that could be printed in any material such as for the production of newspaper, regular mail, and other types of communications.

Figure 16:
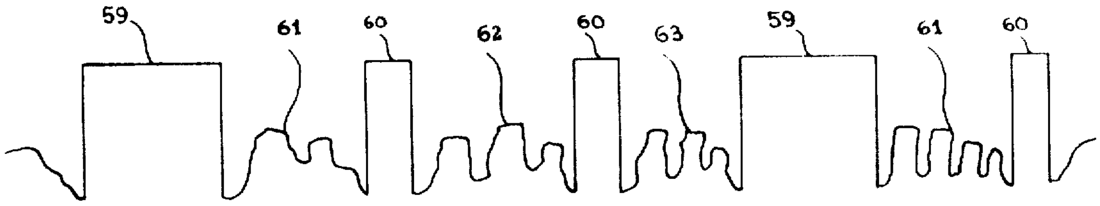
FIG. 16 is a graph of typical electrical signals encountered in the use of the invention in its application to color image transmission.

FIG. 16 in conjunction with FIG. 15 illustrates an example of how this information could be transmitted, through TV channels of information, by the transmission of "horizontal" 59 and "vertical" 60 synchronizing impulses separating information carrying "lines" 61, 62, and 63, each line carrying a different color information. This plurality of color lines could be received by an appropriate electromagnetic receiver such as a regular TV set, that would convert this signal into a cathode-ray image con converted by my apparatus into mechanical pressure lines which will apply the pressure on the material to be printed at a point in space which will place said material in contact with the desired color embedded material. The use of my matrix, conveying a large enough number of pressure output points (about half a million points) and utilizing a regular TV channel as communication media, a regular 100 page colored magazine could be transmitted in about 2 to 3 minutes. By extending the transmitting time to several hours, the conversion to printed matter could be accomplished by my matrix of about 10,000 pressure points and containing only three horizontal lines (64, 65, and 66 FIG. 15), corresponding to the few horizontal lines transmission through the TV channel as illustrated in FIG. 16 (61, 62, and 63).

FIG. 17 illustrates a method by which a matrix requiring relatively bulky electromagnets to accomplish a particular desired result may have its pins (68, 69, 70, and 71) held mechanically closer by an appropriate spacer 72 so as to have its pressure points (73, 74, 75 and 76) closer together. The finer detail possible by the utilization of this method could be used very advantageously in printing of alphameric data, newspapers, pictures, etc. as mentioned previously, as well as in the preparation printed color or black and white pictures by computers. This finer detail possible by this embodiment as illustrated in FIG. 17, could also be used for the communication or preparation of lithographic plates by allowing for the utilization of using appropriately strong electromagnets in the matrix and appropriately small and finely spaced points at the same time, as illustrated.

FIG. 18 illustrates a possible construction of the electromagnets where both sets of electromagnets (77 and 78) are of such a construction that in one of the sets, the electromagnet windings 79 will move together as one unit with its core or pin (80). In FIG. 18 another construction of the electromagnets is shown where only one pin 81 is used and is common to both electromagnets 82 and 83. FIGS. 18 and 19 show one of the methods by which the electromagnets or pins that have been moved or vibrated are caused to return to their basic or original position by means of the mechanical spring 84.

FIG. 19 shows another method of construction where one of the sets of electromagnets has a pin 89 which is one part with its coil winding 87 and where the other set of electromagnets is constructed with a pin 86 which is not connected in one piece with its coil or winding 85.

Figure 20:
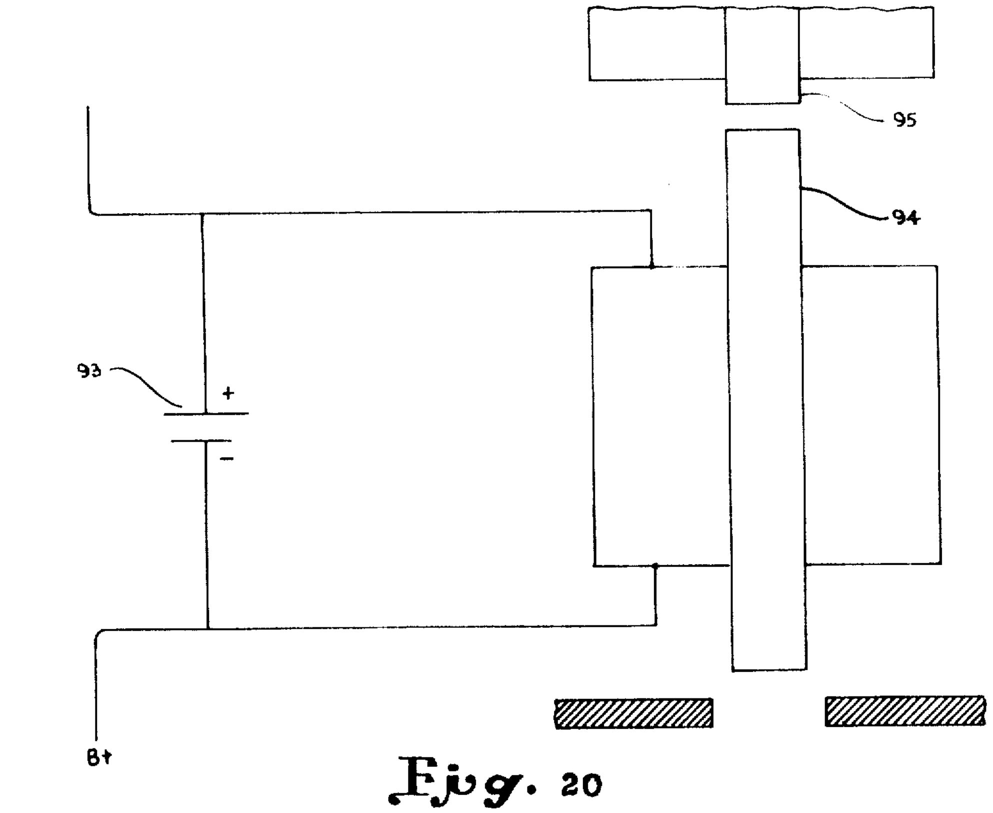
FIG. 20 is an electrical schematic, showing an automatic biasing return, in lieu of magnetic return means.

FIG. 20 illustrates another possible construction of the electromagnets where no spring or mechanical part is needed to return the electromagnet to its original position, and where an electrical bias 93 opposite to that used to move the electromagnets, is used to return the pins to their original position by creating a magnetic field that will attract the pin 94 to the core of the other set of electromagnets 95.

FIG. 21 illustrates another configuration of the electromagnet where no spring or mechanical part is needed to return the electromagnet to its original position due to gravity or to the "springiness" or flexibility of the material 91 with which it may be placed in contact when gravity or the material may return the electromagnet 92, to a neutral position without the use of other mechanical or electric aids.

Although but a few embodiments of the present invention have been illustrated and described, it is apparent to those skilled in the art that any number and types of instruments and transducers may be used as the information gathering instruments described and referred to herein as circuitry such as computers, infrared devices, radar devices, electromagnetic wave receivers (such as radio and TV receivers) and many others.

It will also be apparent to those skilled in the art that the motion and pressure imparted in the pins of the electromagnets, or movable portion of the solenoidal electromagnet in the matrix may be in turn transmitted to any other substance or object not necessarily mentioned herein and that said pin or portion of matter itself be the carrier or reflector of any other form of energy, such as electric potential, heat, electromagnetic waves, light, and others which in turn may be imparted into any other objects whether placed in contact with the pin or not. It is also apparent that the pins may serve as actuators of switches or other devices as well as to serve themselves as the moving conductors in a switch or similar device.

It will also be apparent to those skilled in the art that any number of applicable types of amplifiers, switching circuits, discriminators, inverters, integrators, binary counters, and other type of circuitry may be placed between the electrodes in the cathode-ray tubes and the electromagnet matrix in order to amplify or otherwise enhance or control the functioning of the mechanism.

It is also apparent to those skilled in the art that the cathode-ray control circuits may have innumerable types of configurations and the cathode-ray gun may also have many types of operations and configurations whether they be electromagnetic or electrostatic and that horizontal and vertical synchronizing pulses may have many waveforms or frequencies available within the state of the art and that said signals may be in ways fed back into the TV camera circuitry, computer circuitry or any previous gathering media in such a way as to enhance the operation of this device, or control additional operations or devices such as carriage mechanisms, color lens switching, etc.

Again it will also be apparent to those skilled in the art that several cathode-ray beam display system are available for the production and/or display of designs and characters on a CRT, all of which, whether mechanical or electrical may be utilized with the transducing mechanism described herein for the transducing of the CRT image into a correspondent mechanical or other image as described. It will also be apparent to those skilled in the art that any number of materials may be used for the construction of the items enumerated herein as part of this invention, including different kinds of metals, semiconductors, conducting glass and plastics, and other materials for the electrodes and connections and many other materials, whether metal, plastic, glass, rubber, leather, or others, as well as combinations of the same, may be used for the construction of the electromagnet axial pins and that there are many ways and materials which can be used to mechanically couple the electromagnet matrix into any person or object such as printing carriage, forms control mechanism, press or other devices or objects.

It is apparent to anyone skilled in the art that several types of display information are possible in a cathode-ray tube other than by positioning of the beam in the face of the tube or of the intensity of the beam at desired positions. Also, that various types of electron gun assemblies are utilized to produce spacial effects, such as the use of synchronized masks that allow only particular portions of the total raster area to appear on the face of the tube such as are found on CRT displays for computers. Other computers outputs are available that combine complex coordinate input singles as to "write" with the beam on the face of the tube thus following a nonraster type of pattern which may constitute letters, figures, map outlines, or plans. These may be further combined with amplitude modulation of the beam to form multidimensional images representative of any information produced by any commercially available analog or digital computer. It is also known by anyone versed in the arts that the simple oscilloscope can project through the gun of its cathode-ray tube and at a practically infinite variety of time constants, any information acquired in the form of an electrical potential. It is further known by those skilled in the arts that sampling methods of such signals are utilized, as well as that any oscilloscope worth its commercial price has Z-axis inputs that permit the coupling of simultaneous signals to beam magnitude and the vertical deflection, thus representing two dimensional information against time or against a third coordinated information introduced to the Horizontal Input. It is further known and published in High School physics text books that Lissajous figures and other nonlinear, nonraster types of information can be applied to a CRT deflection system.

The field of CRT deflection systems (electrostatic, electromagnetic, mixed combinations, etc.) is so broad as to be beyond the requirement of a simple description insofar as anyone dealing with information display system through CRT's knows the practically infinite combinations possible for cathode-ray deflection, magnitude control and information carrying capacity. It is also known in the arts that any electrical potentials, static or variable can be displayed in a CRT, regardless of its origin. It is therefore impossible to enumerate the ways in which electric potentials may be produced.

It will also be apparent to those skilled in the art that a plurality of the described devices may be used together or in any combination with itself or other devices. In the case of the use of this device as applied to human beings and in particular to sightless human beings, it obviously can be used in a combination of a plurality of them, with a plurality of cameras, lenses, etc. to transmit bivisual or stereoscopic images, as well as colored images, through the use of colored filters or television cameras, or a plurality of cameras with different color filters in them. This applies as well to the use of telescopic, wide angle microscopic and other types of lenses as well as lenses or filters sensitive to different types or frequencies of electromagnetic radiation. This device could also be applied with any form or method of transmitting an electromagnetic wave to be in turn received by a proper receiving transducer as long as any such device attached to this invention will be capable of producing an image in a cathode-ray tube.

In other words, the basic apparatus of the invention which comprises a source of information displayable upon a cathode-ray tube or equivalent; coincident type scanning means responsive to the information scanned may have multiple end uses as have have herein been before named. Another such use is as a multiple electrical switch which could readily have 10,000 or 2,000,000 contacts all individually actuable. Therefore, it is intended that the invention be only limited by the scope of the appended claims wherein what is claimed is:

I claim:

1. Apparatus for transducing cathode-ray portrayable information into corresponding spacial effects at a receptive medium comprising, in combination means for controlling a cathode-ray tube in accordance with the cathode-ray portrayable information; means for detecting the cathode-ray portrayed information; and means responsive to said detecting means to produce a spacial effect at a remote point in the spacial effects corresponding to the point in the cathode-ray portrayable information where the cathode-ray portrayable information is detected; said means responsive to said detecting means comprising a plurality of effect producing elements capable of producing the spacial effects at said receptive medium at a spacially fixed location relative to the effect producing elements without scanning movement between the effect producing elements and the receptive medium.

2. The apparatus claim 1 wherein the spacial effects comprise mechanical effects generated by selective energization of the effect producing elements.

3. The apparatus of claim 1 wherein said detecting means comprises a plurality of transducer elements and said plurality being in a proportion substantially less than one to one with respect to the number of transduceable points transduceable thereby.

4. The apparatus of claim 1 wherein the spacial effects are created by imparting movement selectively to the effect producing elements.

5. The apparatus of claim 1 wherein the means for detecting comprises a matrix of elements for receiving cathode-ray beam impingements.

6. The apparatus of claim 5 wherein the matrix of elements comprises two separate sets of elements which detect, in discriminate ordinates, the position of the cathode-ray beam impingements.

7. The apparatus of claim 6 wherein the two separate sets of elements each comprise an array having a plurality of individual beam responsive elements for respectively detecting beam position within a set of coordinate axes.

8. The apparatus of claim 6 wherein the two separate sets of elements comprise a first plurality of conductors and a second plurality of conductors electrically isolated there from and out of alignment therewith.

9. The apparatus of claim 1 wherein the plurality of effect producing elements of the detecting means comprises a matrix of electromagnetic transducers.

10. The apparatus of claim 1 wherein the plurality of effect producing elements of the detecting means comprises a matrix of individually movable effect producing elements.

11. The apparatus of claim 9 wherein the transducers each comprise a pair of coils; a plurality of conductors; said coils being respectively connected to separate conductors to comprise a coordinate matrix arrangement; and wherein at least one of the coils in each pair may produce a mechanical pressure.

12. The apparatus of claim 11 wherein said transducers each comprise a movable element adapted to communicate pressure at the receptive medium when its corresponding transducer is activated.

13. The apparatus of claim 11 wherein each transducer comprises a movable element adapted to be moved into contact with the receptive medium when its corresponding transducer is activated.

14. The apparatus of claim 11 further comprising electrodes; means holding the electrodes at the receptive medium for selective contact by said receptive medium.

15. The apparatus of claim 1 wherein the plurality of effect producing elements comprise a printing matrix for printing on said receptive medium.

16. The apparatus of claim 15 wherein the plurality of effect producing elements comprises a plurality of transducers, each comprising a pair of coils; a pair of conductors; said coils respectively connected to separate pairs of conductors to comprise the printing matrix in coordinate form.

17. The apparatus of claim 16 comprising means for mounting the coils to leave at least one coil of each pair to exert mechanical printing pressure.

18. The apparatus of claim 16 further comprising a plurality of movable printing elements respectively activated by selected pairs of coils of said pairs of coils.

19. The apparatus of claim 15 wherein said printing matrix comprises a plurality of discrete groups of printing transducers for enabling color reproduction.

20. The apparatus of claim 19 further comprising a plurality of sources of printing color respectively associated with said discrete groups of printing transducers.

21. The apparatus of claim 1 wherein said plurality of effect producing elements comprises a forming matrix capable of shaping formable objects.

22. The apparatus of claim 1 wherein the forming matrix comprises a plurality of transducers each comprising a pair of coils; a plurality of pairs of conductors; said transducers respectively connected to separate pairs of conductors to comprise a coordinate matrix arrangement.

23. The apparatus of claim 22 comprising means supporting said coils with one coil of each pair being free to produce pressure 24. The apparatus of claim 22 comprising a plurality of movable elements respectively activated by said pairs of coils.

25. The apparatus of claim 1 further comprising a plurality of conductors and wherein said effect producing elements comprise a switching matrix for selectively connecting the conductors.

26. The apparatus of claim 25 wherein the plurality of effect producing elements comprises a plurality of transducers each including a pair of coils; and means supporting the coils to permit one coil in each pair to be free to activate at least one electrical connection.

27. The apparatus of claim 26 further comprising a plurality of movable switching elements respectively activated by said pairs of coils.

28. The apparatus of claim 1 wherein the plurality of effect producing elements is capable of providing a sensorial reception other than sight for a human being.

29. The apparatus of claim 28 wherein the effect producing elements comprises a plurality of transducers each comprising a pair of coils; separate conductors; said coils respectively connected to the separate conductors in a coordinate matrix arrangement.

30. The apparatus of claim 29 comprising means for supporting said coils with one coil in each pair being free to exert a sensorial effect.

31. The apparatus of claim 30 further comprising a plurality of movable sensorial elements respectively actuated by said pairs of coils.

32. Apparatus for transducing cathode-ray portrayable information into spacially corresponding pressures manifested at a receptive medium comprising, in combination means for portraying the cathode-ray portrayable information; a plurality of means for detecting the cathode-ray information as portrayed; a plurality of means responsive to said detecting means to produce pressures at the receptive medium spacially corresponding to the detected cathode-ray information; and connection between the plurality of detecting means and the plurality of responsive means; said connection being substantially fewer in number than the plurality of detecting means or the plurality of responsive means.

33. The apparatus of claim 32 wherein the means for producing pressure comprises a plurality of movable elements which move in response to detection of information by the plurality of detecting means.

34. The apparatus of claim 32 wherein said means for detecting comprises a pair of detecting cathode-ray tubes having cathode rays respectively and a matrix of transducing elements for detecting positions of the cathode rays of the cathode-ray tubes; and means to produce pressures comprising electromagnetic means; and elements selectively movable thereby.

35. Apparatus for transducing cathode-ray portrayable information into spacially corresponding mechanical movements manifested at a receptive medium comprising, in combination means for producing a cathode-ray beam; means for controlling the cathode-ray beam from the cathode-ray portrayable information; means for detecting the cathode-ray position in point by point fashion; and means responsive to the detecting means to produce mechanical movements at the receptive medium spacially corresponding to the cathode-ray portrayable information detected in point by point fashion; and means responsive to the detecting means being spacially fixed relative to the receptive medium and capable only of selective mechanical movement relative to the medium.

36. A device for transducing cathode-ray portrayable information into spacially corresponding mechanical movements comprising means for controlling a cathode-ray beam in accordance with the cathode-ray portrayable information; means for detecting the cathode-ray beam position in point by point fashion; means responsive to the detecting means to produce mechanical movements spacially corresponding to the point by point detection of the cathode-ray beam; said mechanical movement spacially corresponding to the detection being manifested in two dimensions by the detection means and fixed relative to the responsive means.

37. Apparatus for transducing cathode-ray portrayable information into spacially corresponding pressure information comprising, in combination means for transducing the portrayable information; said means comprising a cathode-ray-type tube and electron beam; means for providing spot by spot detection of the transduced cathode-ray information; and means responsive to the detection means to produce spacially corresponding pressure in a two dimensional array fixed spacially relative to the responsive means.

38. The apparatus of claim 37 wherein the means providing spot by spot detection comprises a matrix comprising of a first plurality of conductors, and a second plurality of conductors electrically isolated therefrom and out of alignment with the conductors of said first plurality.

39. The apparatus of claim 37 wherein the means for providing spot by spot detection comprises a pair of cathode-ray-type tubes, each comprising an array of elements for beam impingement; and said cathode-ray tubes deflecting respectively each of the two coordinate components of the cathode-ray tube portrayable information simultaneously across and on arrays.

40. Apparatus for converting information portrayable by electron beam energy to coordinate output signals comprising, in combination means for controlling the electron beam energy in accordance with said information; means for controlling beam positions in accordance with said information; and means for detecting beam positions to provide output coordinate signals; said means for detecting comprising a matrix of elements for receiving beam energy.

41. The apparatus of claim 40 wherein the matrix of elements comprises two separate sets of elements, each set of elements detecting the beam positions in discrete ordinates.

42. The apparatus of claim 41 wherein the two separate sets of elements each comprises an array having a plurality of individual beam responsive elements for respectively detecting beam positions as the coordinate signals.

43. The apparatus of claim 42 wherein the two separate sets of elements comprise a first plurality of conductors and a second plurality of conductors electrically isolated therefrom and out of alignment therewith.

44. Apparatus for transducing cathode-ray information into spacially corresponding effects comprising in combination means for controlling a cathode-ray beam by the cathode-ray information; means for detecting the cathode-ray beam; said detecting means comprising a plurality of transducer elements having a proportion substantially less than one to one with respect to the number of transduceable points transduceable thereby; and means responsive to said detecting means to produce spacially corresponding effects in accordance with detection of the cathode-ray beam.

45. Apparatus for transducing cathode-ray portrayable information from one form to another form comprising, in combination means for separating the cathode-ray portrayable information into coordinately related discrete portions; means for applying the cathode-ray portrayable information to the separating means; a plurality of transduced effect producing means; channels connecting the means for separating with the plurality of effect producing means to permit the effect producing means to be responsive to the separating means to produce spacially corresponding effects at a spacially fixed location relative to the plurality of effect producing means; and the number of channels being substantially fewer than the number of said discrete portions of cathode-ray portrayable information.

46. The apparatus of claim 40 wherein said matrix of elements comprises a first set of elements for the detection of a first ordinate of the beam position of the cathode-ray beam; and a second set of elements for detection of a second ordinate of the beam position of the cathode-ray beam.

47. The apparatus of claim 46 wherein the elements are electrically isolated from each other.

48. The apparatus of claim 47 wherein the elements of the first set are are disposed at angles to the elements of the second set to comprise a plurality of spacially overlapping regions; and wherein the electron distribution of the electron beam is sufficiently great as to distribute electrons to the elements defining a spacially overlapping region.

49. The apparatus of claim 44 wherein said transducer elements comprise a matrix having at least two sets of elements disposed at angles to each other to form spacially overlapping regions; and wherein the cathode ray beam when positioned at a spacially overlapping region distributes electrons to at least one element of both sets of elements.